United States Patent
Kang et al.

(10) Patent No.: US 8,736,799 B2
(45) Date of Patent: May 27, 2014

(54) OPTICAL COMPENSATION FILMS AND METHOD FOR REDUCING DARK-STATE LIGHT LEAKAGE OF VERTICAL ALIGNMENT LIQUID CRYSTAL DISPLAYS

(71) Applicant: Shenzhen China Star Optoelectronics Technology Co., Ltd., Guangdong (CN)

(72) Inventors: Chih-Tsung Kang, Shenzhen (CN); Bo Hai, Shenzhen (CN)

(73) Assignee: Shenzhen China Star Optoelectronics Technology co., Ltd., Shenzhen, Guangdong (CN)

( * ) Notice: Subject to any disclaimer, the term of this patent is extended or adjusted under 35 U.S.C. 154(b) by 59 days.

(21) Appl. No.: 13/698,048

(22) PCT Filed: Sep. 28, 2012

(86) PCT No.: PCT/CN2012/082297
§ 371 (c)(1),
(2), (4) Date: Nov. 14, 2012

(65) Prior Publication Data
US 2014/0111751 A1    Apr. 24, 2014

(30) Foreign Application Priority Data
Sep. 24, 2012 (CN) .......................... 2012 1 0358060

(51) Int. Cl.
*G02F 1/1335* (2006.01)

(52) U.S. Cl.
USPC .......................................... 349/118; 349/119

(58) Field of Classification Search
None
See application file for complete search history.

(56) References Cited

U.S. PATENT DOCUMENTS

2006/0098146 A1 *   5/2006   Yano et al. .................... 349/118

* cited by examiner

*Primary Examiner* — Lucy Chien
(74) *Attorney, Agent, or Firm* — Andrew C. Cheng (57) ABSTRACT

Optical compensation films and a method for reducing dark-state light leakage of vertical alignment liquid crystal displays are disclosed. The light path difference (LCΔND) is in a range of 324.3-342.8 nm, and the pretilt angle is in a range of 85 to 90 degrees when measured at a wavelength of 550 nm. Wherein an in-plain retardation value Ro of the biaxial compensation film is in the range of 48-84 nm, an out-of-plain retardation value Rth of the biaxial compensation film is in the range of 160-280 nm, and a retardation value Rth of the TAC compensation film is within a range between Y1 and Y2. The compensation structure with single layer of biaxial compensation film not only can reduce the dark-state light leakage, but also can increase the contrastness and the resolution in the wide viewing angle.

8 Claims, 6 Drawing Sheets

| TAC layer |
| :---: |
| PVA layer |
| TAC layer |
| PSA layer |
| VA Cell layer |
| PSA layer |
| Biaxial layer |
| PVA layer |
| TAC layer |

| TAC layer |
| --- |
| PVA layer |
| TAC layer |
| PSA layer |
| VA Cell layer |
| PSA layer |
| Biaxial layer |
| PVA layer |
| TAC layer |

FIG. 1

| TAC layer |
| --- |
| PVA layer |
| Biaxial layer |
| PSA layer |
| VA Cell layer |
| PSA layer |
| Biaxial layer |
| PVA layer |
| TAC layer |

FIG. 2

Dark-state light leakage distribution

FIG. 3

Dark-state light leakage distribution

FIG. 4

Contrastness distribution in a wide viewing angle

FIG. 5

Contrastness distribution in a wide viewing angle

| PVA layer |
|---|
| VA Cell layer |
| TAC layer |
| Biaxial layer |
| PVA layer |

FIG. 10

| PVA layer |
|---|
| Biaxial layer |
| TAC1 layer |
| VA Cell layer |
| TAC2 layer |
| PVA layer |

FIG. 11

| PVA layer |
|---|
| TAC2 layer |
| VA Cell layer |
| TAC1 layer |
| Biaxial layer |
| PVA layer |

FIG. 12

Dark-state light leakage distribution

FIG. 13

Contrastness distribution in a wide viewing angle

FIG. 14

OPTICAL COMPENSATION FILMS AND METHOD FOR REDUCING DARK-STATE LIGHT LEAKAGE OF VERTICAL ALIGNMENT LIQUID CRYSTAL DISPLAYS

BACKGROUND OF THE INVENTION

This application claims priority to China Patent Application No. 201210358060.1 filed on Sep. 24, 2012 entitled, OPTICAL COMPENSATION FILMS AND METHOD FOR REDUCING DARK-STATE LIGHT LEAKAGE OF VERTICAL ALIGNMENT LIQUID CRYSTAL DISPLAY, all of the disclosures of which are incorporated herein by reference in their entirety.

1. Field of the Invention

Embodiments of the present disclosure relate to optical technology, and more particularly to optical compensation films and a method for reducing dark-state light leakage of vertical alignment liquid crystal display.

2. Discussion of the Related Art

As the view angles of the thin film transistor LCD (TFT-LCD) increase, the contrastness and the resolution of the display are decreased for the reason that the birefringence of the liquid crystal changes in accordance with the change of the view angles. By adopting wide view angle compensation films, the dark-state light leakage may be reduced and the brightness of the display may be greatly increased.

Figure 1:
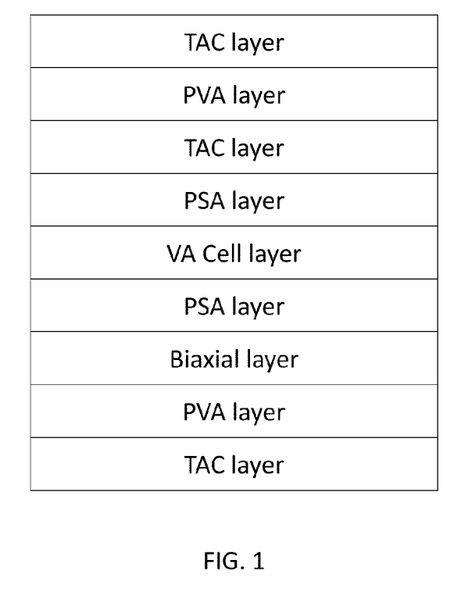
FIG. 1 is a schematic view of the conventional single-layer biaxial compensation structure.
Figure 2:
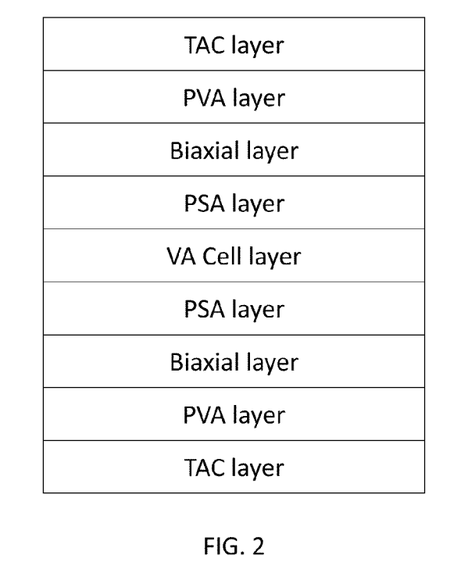
FIG. 2 is a schematic view of the conventional double-layers biaxial compensation structure.

Normally, the compensation films amend the phase displacements of the liquid crystal in different view angles so that the birefringence of the liquid crystal is compensated symmetrically. Different compensation films are designed for different display modes of liquid crystal. For example, vertical alignment (VA) display modes are for large size liquid crystal display. Other examples include the N-TAC compensation films of Konica, Zeonor films of OPOTES, F-TAC compensation films of Fujitsu, and X-plate films of Nitto Denko. The conventional single-layer biaxial compensation structure is shown in FIG. 1 and the conventional double-layers biaxial compensation structure is shown in FIG. 2. The single-layer biaxial compensation structure is formed by a Triacetate Cellulose (TAC) film, a Poly Vinyl Alcohol (PVA) film, the TAC compensation film, a Pressure Sensitive Adhesive (PSA) film, a VA cell film, the PSA film, a biaxial film, the PVA film, the TAC compensation film in turn.

Adopting the double-layers biaxial compensation structure decreases the dark-state light leakage to enhance the brightness and the resolution. However, the cost of the double-layers biaxial compensation structure is high. In addition, adopting the single-layer biaxial compensation structure may reduce the cost, but the dark-state light leakage may happen.

Figure 3:
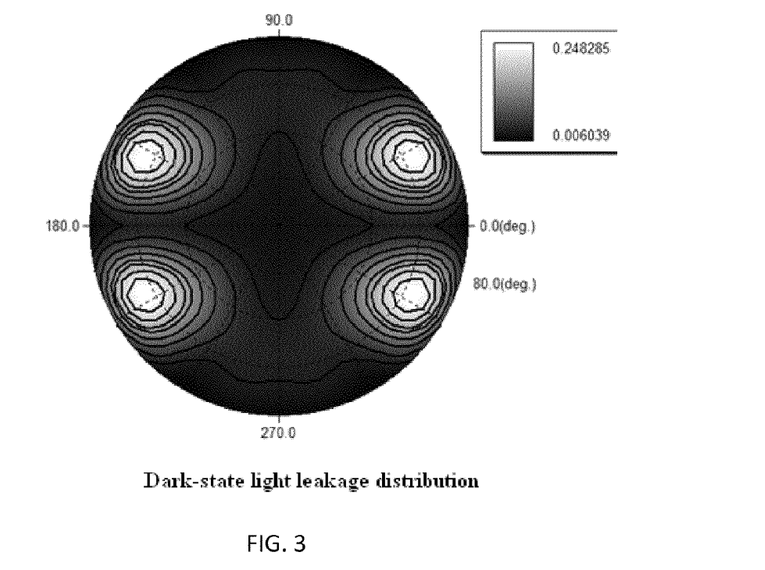
FIG. 3 is a distribution diagram showing the dark-state light leakage of the conventional single-layer biaxial compensation structure.
Figure 4:
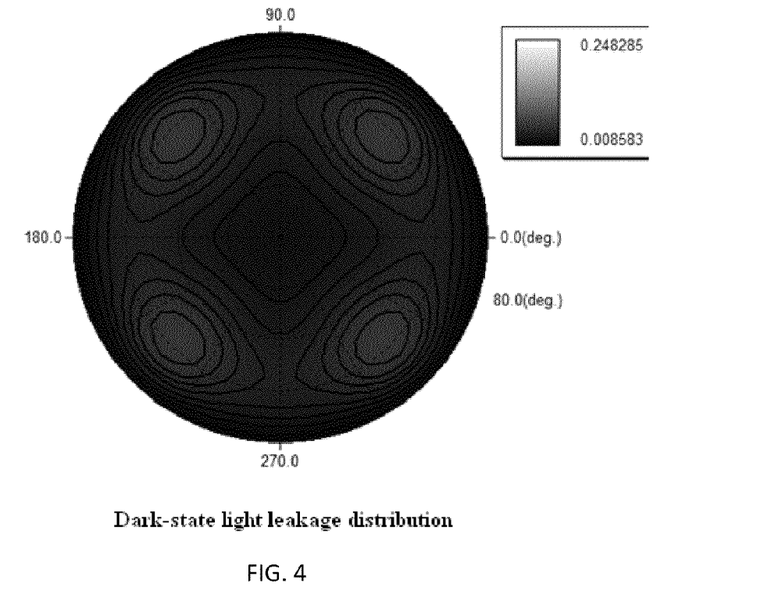
FIG. 4 is a distribution diagram showing the dark-state light leakage of the conventional double layer-biaxial compensation structure.

FIGS. 3 and 4 are distribution diagrams showing the dark-state light leakage of the conventional single-layer biaxial and double-layers biaxial compensation structure when the light path difference (LCΔND) is equal to 333.6 nm and the pretilt angle is 89 degree.

Figure 5:
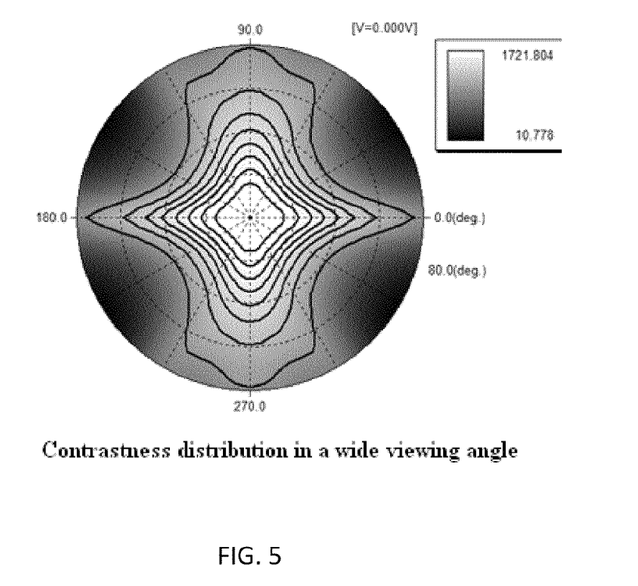
FIG. 5 is a simulation diagram of the contrastness distribution for the conventional single-layer biaxial compensation structure in a wide viewing angle.
Figure 6:
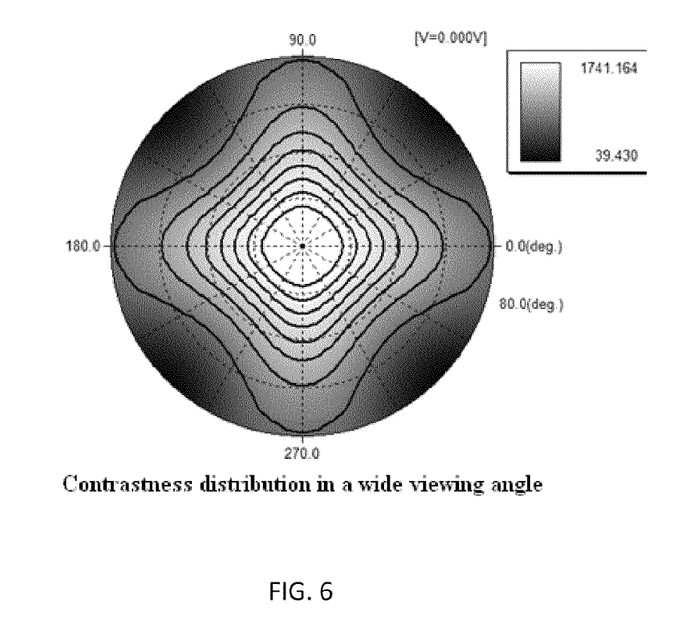
FIG. 6 is a simulation diagram of the contrastness distribution for the conventional double-layer biaxial compensation structure in the wide viewing angle.
Figure 7:
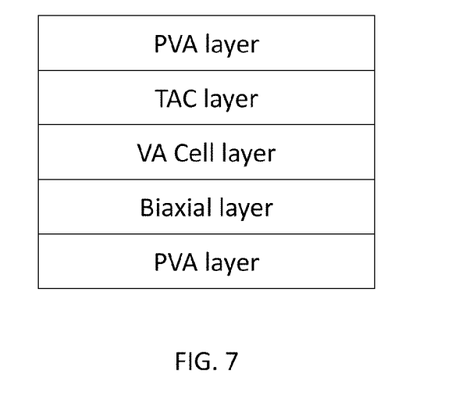
FIG. 7 is a schematic view of a first single-layer biaxial compensation structure in accordance with one embodiment.
Figure 8:
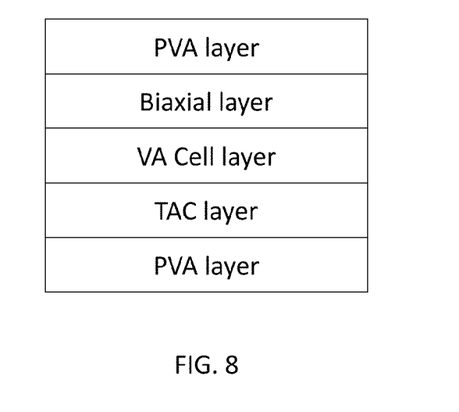
FIG. 8 is a schematic view of a second single-layer biaxial compensation structure in accordance with one embodiment.
Figure 9:
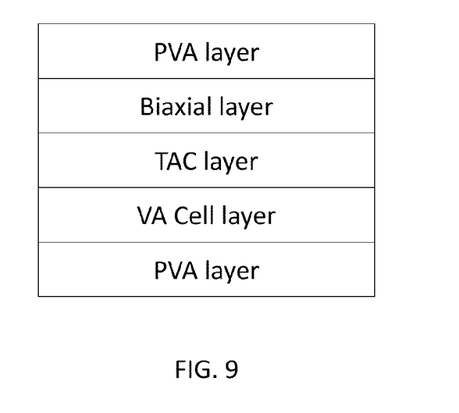
FIG. 9 is a schematic view of a third single-layer biaxial compensation structure in accordance with one embodiment.
Figure 10:
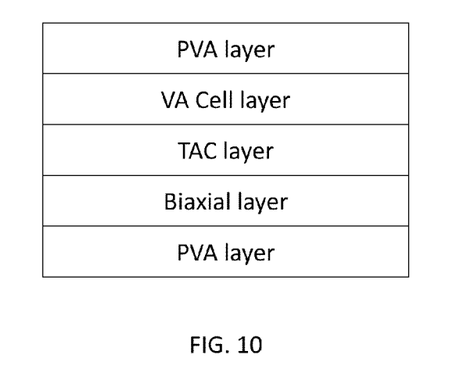
FIG. 10 is a schematic view of a forth single-layer biaxial compensation structure in accordance with one embodiment.

FIGS. 5 and 6 are simulation diagrams of the contrastness distribution for the conventional single-layer biaxial and double-layers biaxial compensation structures in a wide viewing angle. It can be seen from FIGS. 3 to 6 that the light leakage of the double-layers biaxial compensation structure is much less than that of the single-layer biaxial compensation structure. In addition, the contrastness distribution of the double-layers biaxial compensation structure is also better that that of the single-layer biaxial compensation structure.

Therefore, there is a need to solve the dark-state light leakage using the single-layer biaxial compensation structure.

SUMMARY

The object of the claimed invention is to decrease the dark-state light leakage when adopting the single-layer biaxial compensation structure, and to increase the contrastness and the resolution in the wide viewing angle at the same time.

In one aspect, an optical compensation film for vertical alignment liquid crystal displays, the optical compensation film includes at least one biaxial compensation film and one TAC compensation film, wherein a light path difference (LCΔND) is in the range of 324.3-342.8 nm, and a pretilt angle is in a range of 85 to 90 degrees when measured at a wavelength of 550 nm, and wherein an in-plain retardation value Ro of the biaxial compensation film is in the range of 48-84 nm, an out-of-plain retardation value Rth of the biaxial compensation film is in the range of 160-280 nm, and a retardation value Rth of the TAC compensation film is within a range between Y1 and Y2, wherein:

$$Y1=0.00521518X^2-3.12384X+482.11$$

$$Y2=-0.00677798X^2+1.9941X+24.78,$$

X representing the out-of-plain retardation value Rth.

In another aspect, a method for reducing dark-state light leakage for vertical alignment liquid crystal displays using an optical compensation film, the optical compensation film comprising at least one biaxial compensation film and one TAC compensation film, wherein a light path difference (LCΔND) is in the range of 324.3-342.8 nm and a pretilt angle is in a range of 85 to 90 degrees when measured at a wavelength of 550 nm, the method includes adjusting a range of an in-plain retardation value Ro of the biaxial compensation film to be from 48 to 84 nm; adjusting a range of an out-of-plain retardation value Rth of the biaxial compensation film to be from 160 to 280 nm; and adjusting a range of a retardation value Rth of the TAC compensation film to be from Y1 to Y2, wherein:

$$Y1=0.00521518X^2-3.12384X+482.11$$

$$Y2=-0.00677798X^2+1.9941X+24.78,$$

X representing the out-of-plain retardation value Rth.

Wherein the step of adjusting the range of the in-plain retardation value Ro and the step of adjusting the range of the out-of-plain retardation value Rth include: adjusting a thickness (d) of the biaxial compensation film when the values of the reflective rate Nx, Ny, and Nz of the biaxial compensation film are determined, and the range of the in-plain retardation value Ro and the range of the out-of-plain retardation value Rth of the biaxial compensation film are adjusted according to:

$$Ro=(Nx-Ny)*d$$

$$Rth=[(Nx+Ny)/2-Nz]*d$$

wherein Nx represents a maximum reflective rate of the X-direction of the in-plain of the biaxial compensation film, Ny represents a reflective rate of a Y-direction perpendicular to the X-direction, and Nz represents a reflective rate of a thickness direction of the biaxial compensation film.

Wherein the step of adjusting the range of the retardation value Rth of the TAC compensation film further includes: adjusting a thickness (d) of the TAC compensation film when the values of the Nx, Ny, and Nz of the TAC compensation film are determined, and the retardation value Rth of the TAC compensation film is adjusted to be in the range between Y1 and Y2 according to:

$$Rth=[(Nx+Ny)/2-Nz]*d$$

wherein Nx represents the maximum reflective rate of the X-direction of the in-plain of the TAC compensation film, Ny represents the reflective rate of the Y-direction perpendicular to the X-direction, and Nz represents the reflective rate of the thickness direction of the TAC compensation film.

Wherein the step of adjusting the range of the in-plain retardation value Ro and the step of adjusting the range of the out-of-plain retardation value Rth include: adjusting the values of the reflective rates Nx, Ny, Nz when the values of the thickness (d) of the biaxial compensation film is determined according to:

$$Ro=(Nx-Ny)*d$$

$$Rth=[(Nx+Ny)/2-Nz]*d$$

wherein Nx represents a maximum reflective rate of the X-direction of the in-plain of the biaxial compensation film, Ny represents the reflective rate of a Y-direction perpendicular to the X-direction, and Nz represents the reflective rate of a thickness direction of the biaxial compensation film.

Wherein the step of adjusting the range of the retardation value Rth of the TAC compensation film further includes: adjusting the values of the Nx, Ny, and Nz when the thickness (d) of the TAC compensation film are determined, and the retardation value Rth of the TAC compensation film is adjusted to be in the range between Y1 and Y2 according to:

$$Rth=[(Nx+Ny)/2-Nz]*d$$

wherein Nx represents the maximum reflective rate of the X-direction of the in-plain of the TAC compensation film, Ny represents the reflective rate of the Y-direction perpendicular to the X-direction, and Nz represents the reflective rate of the thickness direction of the TAC compensation film.

Wherein the step of adjusting the range of the in-plain retardation value Ro and the step of adjusting the range of the out-of-plain retardation value Rth include: adjusting the values of the reflective rates Nx, Ny, Nz and the thickness (d) of the biaxial compensation film at the same time, the in-plain retardation value Ro and the out-of-plain retardation value Rth of the biaxial compensation film are adjusted according to:

$$Ro=(Nx-Ny)*d$$

$$Rth=[(Nx+Ny)/2-Nz]*d$$

wherein Nx represents the maximum reflective rate of the X-direction of the in-plain of the biaxial compensation film, Ny represents the reflective rate of a Y-direction perpendicular to the X-direction, and Nz represents the reflective rate of a thickness direction of the biaxial compensation film.

Wherein the step of adjusting the range of the retardation value Rth of the TAC compensation film further includes: adjusting the values of the reflective rates Nx, Ny, Nz and the thickness (d) of the biaxial compensation film at the same time and the range of the retardation value Rth of the TAC compensation film are adjusted according to:

$$Rth=[(Nx+Ny)/2-Nz]*d$$

wherein Nx represents the maximum reflective rate of the X-direction of the in-plain of the TAC compensation film, Ny represents the reflective rate of the Y-direction perpendicular to the X-direction, and Nz represents the reflective rate of the thickness direction of the TAC compensation film.

DETAILED DESCRIPTION OF THE EMBODIMENTS

Embodiments of the invention will now be described more fully hereinafter with reference to the accompanying drawings, in which embodiments of the invention are shown.

An embodiment of the claimed invention includes an optical compensation film for vertical alignment (VA) LCDs. Specifically, the light path difference (LCΔND) is in a range of 324.3-342.8 nm, and the pretilt angle is in a range of 85 to 90 degrees when measured at wavelength of 550 nm. By adjusting the retardation values of the biaxial compensation film and the TAC compensation film, the dark-state light leakage may be decreased.

The compensation structures of the optical compensation film for the vertical alignment VA LCD are shown in FIGS. 7 to 10. When measured at wavelength of 550 nm, the light path difference (LCΔND) is in a range of 324.3-342.8 nm, and the pretilt angle is in a range of 85 to 90 degrees. An in-plain retardation value Ro of the biaxial compensation film is in the range of 48-84 nm, and an out-of-plain retardation value Rth of the biaxial compensation film is in the range of 160-280 nm. A retardation value Rth of the TAC compensation film is within a range between Y1 and Y2, wherein:

$$Y1=0.00521518X^2-3.12384X+482.11$$

$$Y2=-0.00677798X^2+1.9941X+24.78,$$

X representing the out-of-plain retardation value Rth.

The above parameters are shown in Table 1.

TABLE 1

| LC ΔNd (nm) | In-plain retardation value Ro (nm) of the biaxial compensation film | Out-of-plain retardation value Rth (nm) of the biaxial compensation film | Retardation value Rth of the TAC compensation film |
|---|---|---|---|
| [324.3, 342.8] nm | [48, 84] nm | [160, 280] nm | [$Y_1$, $Y_2$] nm |

Figure 11:
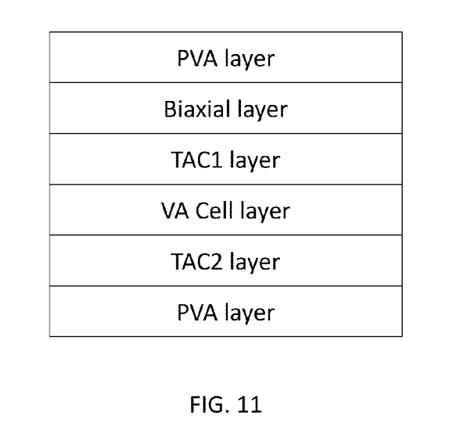
FIG. 11 is a schematic view of a fifth single-layer biaxial compensation structure in accordance with one embodiment.
Figure 12:
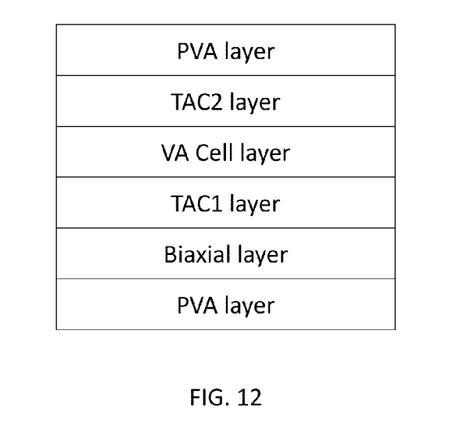
FIG. 12 is a schematic view of a sixth single-layer biaxial compensation structure in accordance with one embodiment.

When the compensation structure of the optical compensation film are the same with that shown in FIGS. 11 and 12, the retardation value Rth of the TAC compensation film is a sum of the retardation values Rth of TAC1 compensation film and TAC2 compensation films.

In the above embodiment, the dark-state light leakage may be reduced by adjusting the in-plain retardation values Ro, the out-of-plain retardation value Rth of the biaxial compensation film, and the retardation value Rth of the TAC compensation film.

Another embodiment includes methods for reducing the dark-state light leakage of the VA LCD by the optical compensation film. Firstly, when measured at wavelength of 550 nm, the light path difference (LCΔND) is in the range of 324.3-342.8 nm, and the pretilt angle is in the range between 85 to 90 degrees. The methods include the following steps: adjusting the range of the in-plain retardation value Ro of the biaxial compensation film to be from 48 to 84 nm, adjusting the range of the out-of-plain retardation value Rth of the biaxial compensation film to be from 160 to 280 nm, and adjusting the range of the retardation value Rth of the TAC compensation film to be from Y1 to Y2, wherein:

$$Y1 = 0.00521518X^2 - 3.12384X + 482.11$$

$$Y2 = -0.00677798X^2 + 1.9941X + 24.78$$

X represents the out-of-plain retardation value Rth.

Specifically, there are three methods to achieve the above adjustments.

The first method relates to adjust a thickness (d) of the biaxial compensation film when the values of the reflective rate Nx, Ny, and Nz of the biaxial compensation film are determined. The in-plain retardation value Ro is adjusted to be in the range of 48-84 nm, and the out-of-plain retardation value Rth is adjusted to be in the range of 160-280 nm according to:

$$Ro = (Nx - Ny)*d$$

$$Rth = [(Nx + Ny)/2 - Nz]*d$$

Wherein Nx represents the maximum reflective rate of the X-direction of the in-plain of the biaxial compensation film. Ny represents the reflective rate of a Y-direction perpendicular to the X-direction. Nz represents the reflective rate of a thickness direction of the biaxial compensation film.

In addition, the thickness (d) of the TAC compensation film is adjusted when the values of the reflective rate Nx, Ny, and Nz of the TAC compensation film are determined. The retardation value Rth of the TAC compensation film is adjusted to be in the range between Y1 and Y2 according to:

$$Rth = [(Nx + Ny)/2 - Nz]*d$$

Wherein Nx represents the maximum reflective rate of the X-direction of the in-plain of the TAC compensation film. Ny represents the reflective rate of the Y-direction perpendicular to the X-direction. Nz represents the reflective rate of the thickness direction of the TAC compensation film.

The second method relates to adjust the reflective rates Nx, Ny, Nz when the values of the thickness (d) of the biaxial compensation film are determined according to:

$$Ro = (Nx - Ny)*d$$

$$Rth = [(Nx + Ny)/2 - Nz]*d$$

Wherein Nx represents the maximum reflective rate of the X-direction of the in-plain of the biaxial compensation film. Ny represents the reflective rate of the Y-direction perpendicular to the X-direction. Nz represents the reflective rate of the thickness direction of the biaxial compensation film.

The range of the in-plain retardation value Ro of the biaxial compensation film is adjusted to be from 48 to 84 nm. The range of the out-of-plain retardation value Rth of the biaxial compensation film is adjusted to be from 160 to 280 nm.

The range of the retardation value Rth of the TAC compensation film is adjusted to be from Y1 to Y2 according to:

$$Rth = [(Nx + Ny)/2 - Nz]*d$$

Wherein Nx represents the maximum reflective rate of the X-direction of the in-plain of the TAC compensation film. Ny represents the reflective rate of the Y-direction perpendicular to the X-direction. Nz represents the reflective rate of the thickness direction of the TAC compensation film.

The third method relates to adjust the values of the reflective rates Nx, Ny, Nz and the thickness (d) of the biaxial compensation film at the same time. The in-plain retardation value Ro of the biaxial compensation film is adjusted to be in the range of 48-84 nm, and the out-of-plain retardation value Rth of the biaxial compensation film are adjusted to be in the range of 160-280 nm according to:

$$Ro = (Nx - Ny)*d$$

$$Rth = [(Nx + Ny)/2 - Nz]*d$$

Wherein Nx represents the maximum reflective rate of the X-direction of the in-plain of the biaxial compensation film. Ny represents the reflective rate of the Y-direction perpendicular to the X-direction. Nz represents the reflective rate of the thickness direction of the biaxial compensation film.

In addition, the thickness of the TAC compensation film and the values of the reflective rate Nx, Ny, and Nz of the TAC compensation film are adjusted at the same time. The retardation value Rth of the TAC compensation film is adjusted to be in the range between Y1 and Y2 according to:

$$Rth = [(Nx + Ny)/2 - Nz]*d$$

Wherein Nx represents the maximum reflective rate of the X-direction of the in-plain of the TAC compensation film. Ny represents the reflective rate of the Y-direction perpendicular to the X-direction. Nz represents the reflective rate of the thickness direction of the TAC compensation film.

Figure 13:
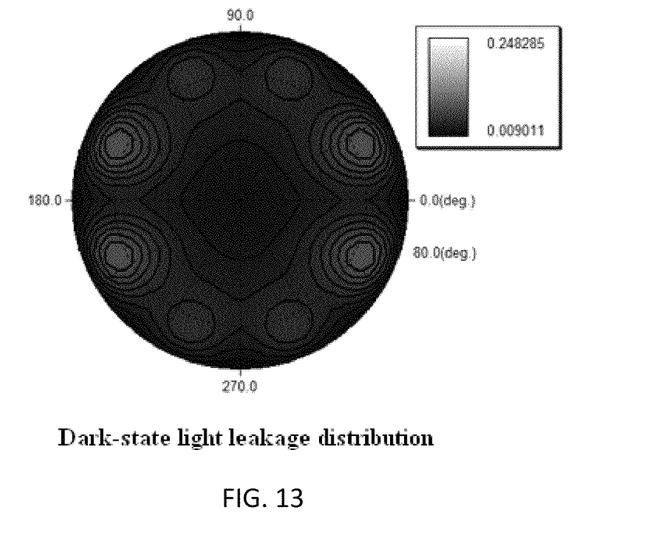
FIG. 13 is distribution diagram showing the dark-state light leakage of the single-layer biaxial compensation structure in accordance with one embodiment.
Figure 14:
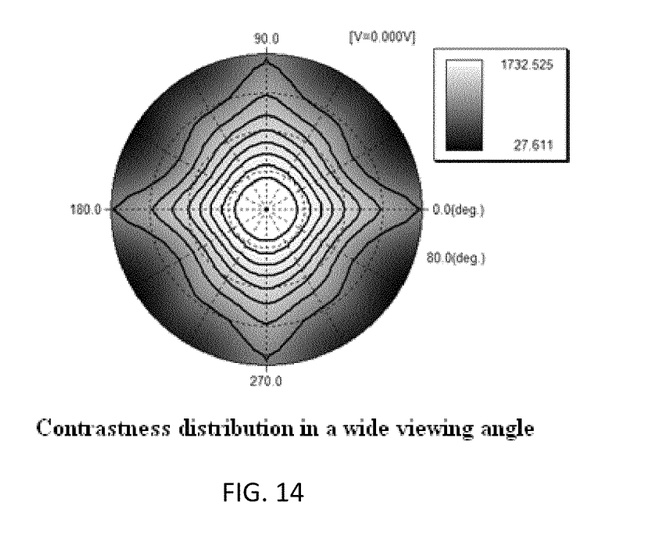
FIG. 14 is a simulation diagram of the contrastness distribution for the single-layer biaxial compensation structure in a wide viewing angle in accordance with one embodiment.

For example, when the light path difference (LCΔND) is 333.6 nm, and the pretilt angle is 89 degrees, the retardation value Ro of the biaxial compensation film is 66 nm and the retardation value Rth of the biaxial compensation film is 220 nm. FIG. 13 shows the distribution diagram of the dark-state light leakage of the TAC compensation film when the retardation value Rth is 82.6 nm. FIG. 14 shows the contrastness distribution in a wide viewing angle of the TAC compensation film.

It can be seen from the comparisons between FIGS. 3 and 13 and between FIGS. 5 and 15 that the dark-state light leakage of the compensation structure is enhanced. In addition, the distribution of the contrastness of the compensation structure is also enhanced. That is, the compensation structure with single layer of biaxial compensation film not only can reduce the dark-state light leakage, but also can increase the contrastness and the resolution in the wide viewing angle. Also, the cost of the compensation structure is much lower than the double-layers biaxial compensation structures.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical compensation film for vertical alignment liquid crystal displays, on which at least one biaxial compensation film and one TAC compensation film are provided, a light path difference (LCΔND) is in the range of 324.3-342.8 nm, and a pretilt angle is in a range of 85 to 90 degrees when measured at a wavelength of 550 nm, and wherein:
   an in-plain retardation value Ro of the biaxial compensation film is in the range of 48-84 nm, an out-of-plain retardation value Rth of the biaxial compensation film is in the range of 160-280 nm, and a retardation value Rth of the TAC compensation film is within a range between Y1 and Y2, wherein:

$Y1=0.00521518X^2-3.12384X+482.11$ $Y2=-0.00677798X^2+1.9941X+24.78,$

X representing the out-of-plain retardation value Rth.

2. A method for reducing dark-state light leakage for vertical alignment liquid crystal displays using an optical compensation film, the optical compensation film comprising at least one biaxial compensation film and one TAC compensation film, wherein a light path difference (LCΔND) is in the range of 324.3-342.8 nm and a pretilt angle is in a range of 85 to 90 degrees when measured at wavelength of 550 nm, the method comprising:
   adjusting a range of an in-plain retardation value Ro of the biaxial compensation film to be from 48 to 84 nm;
   adjusting a range of an out-of-plain retardation value Rth of the biaxial compensation film to be from 160 to 280 nm; and
   adjusting a range of a retardation value Rth of the TAC compensation film to be from Y1 to Y2, wherein:

$Y1=0.00521518X^2-3.12384X+482.11$ $Y2=-0.00677798X^2+1.9941X+24.78,$

X representing the out-of-plain retardation value Rth.

3. The method as claimed in claim 2, wherein the step of adjusting the range of the in-plain retardation value Ro and the step of adjusting the range of the out-of-plain retardation value Rth comprises: adjusting a thickness (d) of the biaxial compensation film when the values of the reflective rate Nx, Ny, and Nz of the biaxial compensation film are determined, and the range of the in-plain retardation value Ro and the range of the out-of-plain retardation value Rth of the biaxial compensation film are adjusted according to:

$Ro=(Nx-Ny)*d$ $Rth=[(Nx+Ny)/2-Nz]*d$ wherein Nx represents a maximum reflective rate of the X-direction of the in-plain of the biaxial compensation film, Ny represents a reflective rate of a Y-direction perpendicular to the X-direction, and Nz represents a reflective rate of a thickness direction of the biaxial compensation film.

4. The method as claimed in claim 2, wherein the step of adjusting the range of the retardation value Rth of the TAC compensation film further comprises: adjusting a thickness (d) of the TAC compensation film when the values of the Nx, Ny, and Nz of the TAC compensation film are determined, and the retardation value Rth of the TAC compensation film is adjusted to be in the range between Y1 and Y2 according to:

$Rth=[(Nx+Ny)/2-Nz]*d$ wherein Nx represents the maximum reflective rate of the X-direction of the in-plain of the TAC compensation film, Ny represents the reflective rate of the Y-direction perpendicular to the X-direction, and Nz represents the reflective rate of the thickness direction of the TAC compensation film.

5. The method as claimed in claim 2, wherein the step of adjusting the range of the in-plain retardation value Ro and the step of adjusting the range of the out-of-plain retardation value Rth comprise: adjusting the values of the reflective rates Nx, Ny, Nz when the values of the thickness (d) of the biaxial compensation film is determined according to:

$Ro=(Nx-Ny)*d$ $Rth=[(Nx+Ny)/2-Nz]*d$ wherein Nx represents the maximum reflective rate of the X-direction of the in-plain of the biaxial compensation film, Ny represents the reflective rate of a Y-direction perpendicular to the X-direction, and Nz represents the reflective rate of a thickness direction of the biaxial compensation film.

6. The method as claimed in claim 2, wherein the step of adjusting the range of the retardation value Rth of the TAC compensation film further comprises: adjusting the values of the Nx, Ny, and Nz when the thickness (d) of the TAC compensation film are determined, and the retardation value Rth of the TAC compensation film is adjusted to be in the range between Y1 and Y2 according to:

$Rth=[(Nx+Ny)/2-Nz]*d$ wherein Nx represents the maximum reflective rate of the X-direction of the in-plain of the TAC compensation film, Ny represents the reflective rate of the Y-direction perpendicular to the X-direction, and Nz represents the reflective rate of the thickness direction of the TAC compensation film.

7. The method as claimed in claim 2, wherein the step of adjusting the range of the in-plain retardation value Ro and the step of adjusting the range of the out-of-plain retardation value Rth comprise: adjusting the values of the reflective rates Nx, Ny, Nz and the thickness (d) of the biaxial compensation film at the same time, the in-plain retardation value Ro and the out-of-plain retardation value Rth of the biaxial compensation film are adjusted according to:

$Ro=(Nx-Ny)*d$ $Rth=[(Nx+Ny)/2-Nz]*d$ wherein Nx represents the maximum reflective rate of the X-direction of the in-plain of the biaxial compensation film, Ny represents the reflective rate of a Y-direction perpendicular to the X-direction, and Nz represents the reflective rate of a thickness direction of the biaxial compensation film.

8. The method as claimed in claim 2, wherein the step of adjusting the range of the retardation value Rth of the TAC compensation film further comprises: adjusting the values of the reflective rates Nx, Ny, Nz and the thickness (d) of the biaxial compensation film at the same time and the range of the retardation value Rth of the TAC compensation film are adjusted according to:

$$Rth=[(Nx+Ny)/2-Nz]*d$$

wherein Nx represents the maximum reflective rate of the X-direction of the in-plain of the TAC compensation film, Ny represents the reflective rate of the Y-direction perpendicular to the X-direction, and Nz represents the reflective rate of the thickness direction of the TAC compensation film.

* * * * *